United States Patent [19]

Nilsen

[11] 4,282,831
[45] Aug. 11, 1981

[54] BACK FLOW CHECK AND SELF-CLEANING SPRING BIASED WATERER VALVE

[76] Inventor: Norman P. Nilsen, P.O. Box 33, Phelan, Calif. 92371

[21] Appl. No.: 959,726

[22] Filed: Nov. 13, 1978

[51] Int. Cl.³ ............................................. A01K 39/02
[52] U.S. Cl. ..................................................... 119/75
[58] Field of Search .................... 119/72, 72.5, 74, 75, 119/79, 80

[56] References Cited

U.S. PATENT DOCUMENTS

| | | |
|---|---|---|
| 2,790,417 | 4/1957 | Brembeck .......................... 119/72 X |
| 2,921,556 | 1/1960 | Nilsen .............................. 119/72.5 X |
| 3,008,451 | 11/1961 | Curry ................................ 119/75 X |
| 3,128,745 | 4/1964 | Alter ....................................... 119/75 |
| 3,505,978 | 4/1970 | Nilsen .................................... 119/75 |
| 3,611,999 | 10/1971 | Hey ..................................... 119/72.5 |
| 3,800,825 | 4/1974 | Zoll ................................. 119/72.5 X |

FOREIGN PATENT DOCUMENTS 2241948  3/1975  France ..................................... 119/72.5

Primary Examiner—Gene Mancene
Assistant Examiner—Robert P. Swiatek
Attorney, Agent, or Firm—William H. Maxwell; Todd S. Parkhurst

[57] ABSTRACT

This invention relates to the watering of poultry with a low pressure water supply and provides sanitary functions of filtering water supplied directly into the waterers and to check both supply and back flow while providing a self-cleaning action, the structure of this invention being incorporated in a valve body which serves to mount the waterer onto a manifold to be independently operable by animal operation and automatically closing when the animal wants are satisfied.

2 Claims, 5 Drawing Figures

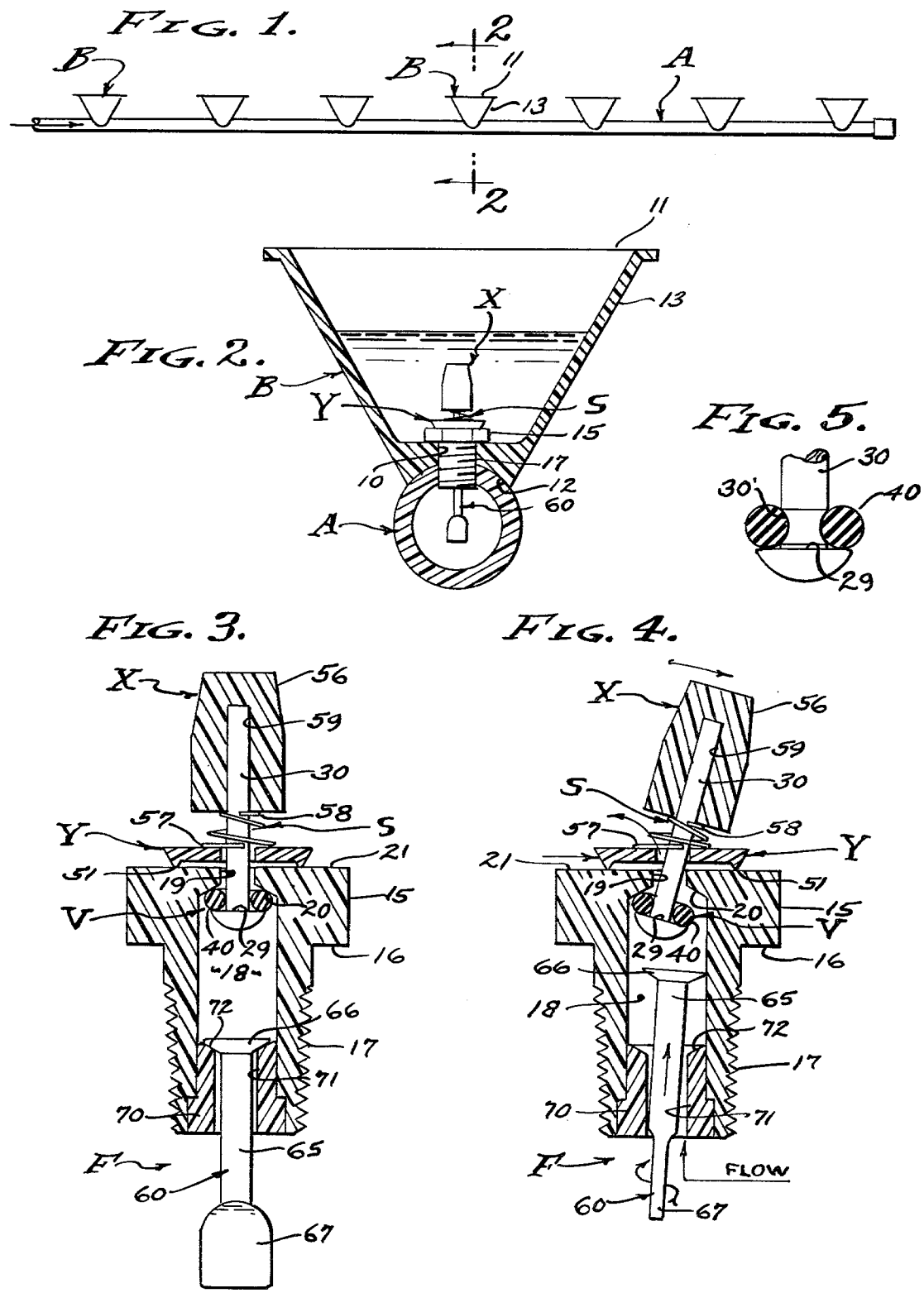

BACK FLOW CHECK AND SELF-CLEANING SPRING BIASED WATERER VALVE

BACKGROUND

This invention is especially concerned with Poultry Watering Apparatus of the type disclosed and claimed in U.S. Pat. No. 2,921,556 issued Jan. 19, 1960, with the cups of Self-Maintaining Poultry Waterer System such as disclosed and claimed in U.S. Pat. No. 3,340,852 issued Sept. 12, 1967, and is an improvement over valve control of Waterer Valve Actuator-Float as disclosed and claimed in my U.S. Pat. No. 3,941,094 issued Mar. 2, 1976. The earliest of said patents discloses and claims an upwardly open vessel with its bottom in open communication with a water supply, and with a freely reciprocable element through the opening for manipulation by the poultry so as to keep the opening clear, a self-cleaning arrangement; and this older concept requires the complications of a level controlled water supply. The second mentioned patent discloses and claims improvements in the same type of upwardly open vessels, or waterer cups, and has the improvement or advantage of eliminating the level controlled water supply, but with problems relating to vibration which required means suppressing resonant frequencies. The second patent discloses and claims the open vessel with its valve means adapted to be displaced laterally by the poultry thereby to misalign the valve and pivoting it upon a valve seal so as to admit water through a central port surrounding the said pin, the said open vessel and said valve means being employed with improvements therein in the practice of the present invention which additionally includes the cooperation therewith of an inherently operable mechanism having a number of functions including; back flow prevention, filtration of the fines carried in the water supply, vibration isolation, and self-cleaning so as to prevent the accumulation therein of packed sedimentary materials and/or mineral deposits. The third patent discloses and claims a float actuated valve in such a waterer, in order to ensure the closing function of the valve but with the float exposed to the pecking habits of the fowl.

Poultry waterers have the ever-present problems of sanitation, insofar as hygiene of the fowl is concerned. Fundamentally, the natural and instinctive habits of the fowl must be met with and their habits are not conducive to cleanliness, and to the contrary measures must be taken to cope with and advantageously employ said natural habits and instinctive actions of the fowl. Therefore, it is a general object of this invention to provide all the advantages of the three (3) aforesaid patented waterers while correcting the deficiencies in the last mentioned patented waterer which is vulnerable to the habits of the fowl that are so destructive to float mechanisms. Accordingly, the present invention provides a positive shut-off when the animal backs away from the waterer cup as a result of the rising water level therein, and promotes sanitary conditions through the prevention of back flow therefrom, through the filtration that prevents fines from passing therethrough and/or collecting therein, and through the isolation of the reservoir cup of the waterer from the water supply under pressure. It is significant that the multiplicity of functions herein referred to are accomplished in the provision of one accessible element in a single body and all of which renders the installation of the waterer units extremely practical.

The back flow function is important in that water discharged into the open reservoir of a waterer cup must be prevented from returning to its source, such as to the manifold from which it is supplied. Therefore, the check valve filter permits passage of water into the cup reservoir and prevents return thereof. Consequently, the manifold supply for the waterer herein disclosed can be serviced, and for example periodically cleaned without disrupting operation of the waterer. Further, with the waterer cup and its poultry operated shut-off valve, pressure changes involved during servicing and cleaning of the manifold supply do not have adverse effect, due to the presence of the back flow check feature.

The filtration and self-cleaning function is important in that the alluvial bodies and minerals carried in the water supply do not accumulate so as to impair operation of the waterer. In practice, hundreds of waterer cup units are employed off a single manifold installation, and it is imperative that maintenance be reduced to a minimum. The self-cleaning function is highly advantageous and concerns itself with elimination of fines, regardless of the magnitude thereof. Consequently, large sized fines are excluded by virtue of the limited passage size involved, small sized fines are passed as inconsequential, and any accumulation of small sized fines and/or mineral deposits or corrosion are worked out and away by the repeated reciprocal motions of the moving elements that characterize the present invention.

The vibration isolating function of the present invention is a requirement upon which the dynamics of the water supply have no effect that would impair operation of the many waterer units involved. In this respect, reference is made to hydraulic surges and resonant frequencies that will develop and cause malfunctioning of such waterer systems. With the mechanism of the present invention, the checking of reverse flow inherently isolates the poultry operated shut-off valve from the manifold pressure surges and/or resonant frequencies that from time to time occur. And, without inducement said surges and resonance will subside and will not be amplified.

In waterer systems where water pressure is relied upon for effecting the normal valve closures, total loss of pressure in the water supply brings about difficulties in reinstating system operation. That is, extensive waterer systems will not build up sufficient pressure in the relatively short length of time required before flooding will occur, and in some instances might never build up pressure because of the total open condition. Therefore, in the event of a catastrophe or power failure due to storms, etc. and beyond human control, extensive waterer systems of the type under consideration must be shut down and restarted, and all of which is time consuming and can occur when man power is not available. Therefore, it is an object of this invention to provide improved waterers by which each individual waterer is positively protected against flooding by providing a spring bias for the valve thereof.

With the foregoing borne in mind, fowl are destructive animals that are raised in multitudes and waterers are therefore correspondingly subject to deterioration. Therefore, any substantial improvement in the valve control of the waterer cups is highly advantageous. In this respect the state of the art provides float controlled waterer cups which include backflow preventors and discharge cleaners, and all of which is related to the cup configuration and normal water level therein coordinated with the animal feeding habits. However, floats that are actuated by the beaks of fowl deteriorate rapidly and are in need of constant repair. Therefore, it is an object of this invention to provide a positive means that is not exposed to the pecking habits of the fowl and which remain reliable in operation so as to ensure closing of the shut-off valve. Cooperating with said shut-off valve actuation is the baffle which acts as a spring seat while it too is biased into tightly sealed engagement with the waterer body so as to preclude downward precipitation of debris.

SUMMARY OF INVENTION

This invention relates to a valve actuator means for poultry waterers and provides therefor a positive spring shut-off for the water supply thereto. The improvement herein resides in the cooperative relationship of a spring S that surrounds a valve pin 30 to oppositely bias an actuator X and a baffle Y. Normally, it is the said pressure potential which serves to maintain valve closure, with a valve actuator X exposed to the animal for momentary operation. Waterers in which this S, X, Y combination is provided are to be used in large numbers applied onto manifold pipes A. In practice, the manifold pipes A and waterer units B are associated with poultry pens, cages and yards wherein different levels are involved and there are variations in water pressures. The operative water pressures normally vary from four to sixteen pounds per square inch, and regardless of any pressure changes it is required that the waterers each maintain normal availability of water therein. Each waterer unit B is complete and operative in itself when applied to the manifold A to have its complete range of functions and at each waterer unit B there is a shut-off valve V operable by the natural habits and instinctive actions of the poultry, and there is a check valve filter F. In practice the manifold A is comprised of a pipe with like or identical and equally spaced upwardly faced openings 10 displaced in a common plane. The waterer units B are threaded into said openings and each is equipped with the spring biased actuator X which is effective to prevent flooding regardless of water pressure fluctuations.

DRAWINGS

The various objects and features of this invention will be fully understood from the following detailed description of the typical preferred form and application thereof, throughout which description reference is made to the accompanying drawings, in which:

FIG. 1 is an elevational view showing waterers as they are installed upon a manifold.

FIG. 2 is an enlarged sectional view showing the Actuator-Spring-Baffle waterer and taken as indicated by line 2—2 on FIG. 1.

FIG. 3 is an enlarged section of the combined waterer valve and Actuator-Spring-Baffle combination utilizing the prior art actuator.

FIG. 4 is a view similar to FIG. 3 illustrating the spring action and movements of the actuator and baffle when the combination is misaligned to discharge water, and FIG. 5 is an enlarged detailed view of the improved valve pin and seal carried thereby.

PREFERRED EMBODIMENT

Referring now to the drawings, the actuator X is a cylindrical member carried by valve pin 30 so as to enable the animal to pivot the valve V for its actuation with consequent release of water on demand.

The cups at each waterer unit B are alike or identical and are provided to receive and to dispense water from the manifold A, and each is a vertically disposed vessel-shaped part open at its top 11 and provided with a ported bottom 12 concaved for engagement on and in communication with the manifold. The cup is a cone-shaped part with outwardly flared side walls 13 that terminate at the top 11, the top being in the form of a flat horizontally disposed peripheral flange. In practice, the top 11 is approximately three inches in diameter and tapers inwardly toward the bottom 12 approximately one inch in diameter. This particular configuration has been found to be successful in serving chickens, the cup being molded plastic material or the like.

The shut-off valve V couples the cup of the waterer unit B to the manifold A and in controlled communication with the interior of said manifold. The valve V has a polygonal body 15 in the nature of a coupler having a shoulder 16 to clamp downwardly upon the top side of the bottom 12, and having a cylindrical wall 17 threadedly engaged with the opening 10. Thus, the valve body 15 clamps the cup in working position on the top side of the manifold pipe, with sealed engagement by virtue of the plasticity in said body 15.

The body 15 of the valve V is fashioned to cooperatively carry the valve parts which control the supply of water to the cup. Functionally, it is desired that only the fowl in drinking therefrom increase and/or reduce the level of water in the cup. And, these functions are automatic and inherent in the spring biased valve V which involves, generally, a valve seat 20, a valve pin 30, a valve seal 40, the baffle Y, and an actuator X. The assembly of parts which forms the valve V is characterized by the valve pin 30 extending loosely through the body 15 and thereby capturing the seal 40 and baffle Y in operating position relative to the body. The actuator body X is pressed onto the valve pin 30 in a manner to hold the valve parts in the assembled condition.

The body 15, as hereinabove described, is a cylindrical part that is threaded into the manifold A to clamp the cup in operative position. Further, the body 15 functions as a duct for delivery of water from the manifold into the cup, and to this end has an opening therethrough. As shown, the opening through said body comprises an enlarged cylindrical chamber 18 of substantially greater cross-section than the valve part that operates therein, and so that said part is free to move laterally therein. In practice, the chamber 18 is a molded bore with a valve seat 20 formed at a 30° angle extending inwardly to a central discharge port 19 that opens at the top 21 of the body. Again, the port 19 is of such diameter as to loosely pass the valve pin 30 extending therethrough with substantial clearance, and the annular valve seat 20 immediately underlies the planar top 21 and separated from said top by the relatively short cylindrical guide port 19, as shown. The top 21 is a flat smooth surface disposed in a plane normal to the longitudinal axis of the body 15.

The valve pin 30 is a straight shaft-like part adapted to enter into the cylindrical chamber 18 from above the top 21, to be operated by the actuator X and to operate the valve seal 40 relative to the valve seat 20. The valve seat 20 faces downwardly at the top of the chamber 18 while the valve pin 30 depends into the chamber through the port 19, where it has an annular shoulder 29 that opposes the seat 20. That is, the outer diameter of the shoulder 29 is substantially greater than the inner diameter of the port 19. Thus, the valve pin 30 presents a straight and upstanding shaft-like part that normally extends along the axis of the body 15 projecting through the port 19 with clearance so as to permit a rocking movement to be described.

The valve seal 40 is an annular part that surrounds the valve pin 30 and is captured in working position between the valve seat 20 and shoulder 29. In accordance with the invention the valve seal 40 and valve pin 30 are biased against the valve seat 20 by the spring S aided by the water pressure within the chamber 18, and in order to have sealing engagement the seal presents a rim that has circular engagement with the said seat 20. In its preferred form the seal 40 is an O-ring that closely and/or frictionally surrounds the valve pin 30 to be carried with the pin in engagement with the shoulder 29. As shown in FIG. 5 the pin and seal combination is improved by rolling a circumferential groove 30' of arcuate cross section into the pin 30 immediate to the shoulder 29, and into which the O-ring seal 40 constricts and fits so as to ensure its sealed position against said shoulder 29. Thus, the seal 40 moves with the pin 30 and the sealing rim is the outer and upper quarter peripheral face of said O-ring. In accordance with the invention, the outer diameter of the valve seal 40 is substantially smaller than the inner diameter of chamber 18 surrounding the valve seat 20, in order to establish a flow restricting passage of annular configuration. And, as a result of the valve seat and valve seal closeness hereinabove described there is a centering action as water expells upwardly through the annular orifice existing between the valve seat 20 and valve pin 30, as well as a centering action when the valve seal 40 engages on the cone-shaped valve seat 20. As a result, the valve pin 30 is centered as and when water flow occurs.

In accordance with this invention, the baffle Y is a plate-like part that fits loosely over the valve pin 30 to be biased lightly against the top 21 of the body 15. In practice, the baffle Y is a disc of plastic material adapted to seal with the top 21 when engaged therewith and to diffuse water discharged when valve V is opened. To this end the baffle Y has a downwardly disposed peripheral lip 51 that engages the top 21 along a line of contact circumscribing the port 19. In practice, the loose fit around pin 30 permits the baffle Y to drop freely onto the top 21, and freely pass the flow of water therearound. The baffle Y is biased by spring S and engages the top 21 so as to preclude the downward precipitation of particles through the port 19, the annulus opening around the pin 30 being centrally located so as to substantially preclude infiltration.

The actuator X is provided to pivot and/or to shift the valve pin 30 and valve seal 40 carried thereby, the fulcrum of said pivotable movement being the peripheral engagement of seal 40 on the valve seat 20. The actuator X is coaxially affixed to the valve pin 30 and is adapted to cause angular displacements of said valve pin, and involves a cylindrical head 56 affixed to the upper end of the valve pin 30, to be nudged laterally so as to cause momentary tilting misalignment of the valve pin. The head 56 is pressed onto the upper portion of the valve pin 30 and is several times the diameter of the pin. As shown, the head 56 is provided with a blind bore 59 pressed onto the valve pin 30 so as to have a stopped location thereon.

In accordance with this invention I provide the spring S which cooperates with the actuator X and baffle Y to oppositely bias the same to closed positions respectively and to permit the lateral displacement of the valve pin 30 as above described while permitting shifting of the baffle for release of water. Accordingly, the spring S is a light compression spring of cone configuration, having a large diameter base coil 57 bearing upon the top surface of the baffle Y and a small diameter top coil 58 bearing against the under side of the actuator X. The compressed spring S tends to separate the actuator X and baffle Y into axial alignment one with the other, to lift the actuator X axially and to depress the baffle Y into normal relation to the axis of pin 30. Accordingly, the large diameter coil 57 bears substantially flat against the top surface of the baffle Y to maintain its sealing lip 51 against the top surface 21 of the valve body, while the small diameter coil 58 bears substantially flat against the underside of the actuator X. The peripheral lip 51 of baffle Y is to be maintained engaged upon the surface 21 to shift laterally thereon when the valve pin 30 is tilted as shown in FIG. 4.

The check valve filter F provides protective functions which enable the shut-off valve V to be reliable in its operation. The check valve filter F involves the body 15 and establishes a releasable closure for the cylindrical chamber 18 therein, in open communication within the pipe of manifold A. In accordance with the invention, the check valve filter F involves but two parts, a moveable poppet 60 and a fixed retainer 70. The poppet 60 is a loose member that is reciprocably operative as a result of water flow through the chamber 18 and when seated upon the retainer 70 water is entrapped within the said chamber. The retainer 70 is a tightly fitted member pressed into a counter bore to occupy the lower portion of chamber 18 in the valve body 15 to close the chamber, and with a port passage 71 to loosely pass the poppet filter rod 65 extending therethrough. The rod 65 is straight and on an axis normal to the poppet valve head 66, and it is captured in working position by its flattened end portion 67 restricting its upward motion so as not to interfere with the valve V, and also to prevent its separation from the retainer (a sub-assembly). Further, the press fit of retainer 70 into the valve body counter bore is flush with the lower end of the body and thereby made virtually inseparable and tamper proof. It is the cylindrical chamber 18 in which the poppet 60 is operable to be lifted by the dynamics of liquid flow and to be returned to a seated position by gravity when conditions are static.

From the foregoing it will be apparent that a very practical arrangement of few and simple parts characterizes the present invention. Each waterer unit B is independently operable to satisfy the wants of the animal instinctively operating the same. Normally, the shut-off valve closes the upper end of chamber 18 and thereby stops the delivery of water therethrough and so that the poppet 60 drops onto the retainer seat 72. As a result, a body of water is entrapped within the chamber 18 and isolated from both the source within manifold A and from the level of water delivered into the waterer cup. The reciprocal movement and misalignment of the filter rod 65 has its function of scrubbing away any collection of foreign materials, while its poppet valve action is operative with the shut-off valve V to create an entrapped body of water with the consequent isolation of the waterer cup unit B from the supply manifold A. During operation of the waterer herein disclosed, the Actuator-Spring-Baffle combination ensures closing of the shut-off valve V unless operated by the animal. Thus, the waterer of the present invention has its decided advantages in assuring a shut-off of water when the level is high in the waterer cup, to be inherently replenished by the wants of the animal engaging and tilting the actuator X for opening of the valve V.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. A positive shut-off and protected poultry waterer unit for dispensing water from a pressured supply into an upwardly open vessel having a side wall of substantially vertical extent for the containment of water to a level therein, and comprising: a valve body with a flat top face and a chamber therethrough and having a port opening at and normal to said top valve body face and into the vessel, a downwardly faced valve seat in said chamber surrounding the port opening therethrough, a shut-off valve with an angularly displaceable pin projecting loosely through said seat and port and said valve pin normally engaging the valve seat and operable therefrom by angular displacement of said pin to open and increase the water level in said vessel, an actuator head of relatively small horizontal extent on the upper end of the pin and exposed within the vessel to be nudged by the beaks of the poultry to angularly displace the pin, a baffle plate of relatively large horizontal extent fitted loosely over the pin and engaged with the top face of the valve body, the small head and large plate acting to encourage the settlement of silt-like particles in a direction away from the waterer unit valve body, and a compression spring acting between the baffle plate and actuator head to depress upon the former and to lift the latter for alignment of the shut-off valve pin into normal alignment and engagement with the valve seat, the poultry waterer unit further including a check valve permitting entry of water into said valve body chamber and normally closing a passage opening into the water supply, said chamber entrapping a body of water between the shut-off valve and the check valve when the shut-off valve and check valve are closed to thereby isolate the water supplied into the vessel from the pressured supply thereof, said check valve comprising a poppet member operable to lift into the chamber with the water flow thereinto, the poppet member including an enlarged top head element permanently located in the chamber and adopted to normally substantially plug a chamber entrance defined in the chamber, a stem extending loosely through the chamber entrance, and a second enlarged poppet member portion having a greater extent than the chamber entrance, the distance between the head top and the second enlarged portion being less than the distance from the head top in its normal plugging position to the shut-off valve, to restrict upward poppet member motion during water flow into the chamber so as to prohibit poppet member interference with the shut-off valve.

2. The poultry waterer unit as set out in claim 1 and further including a check valve permitting entry of water into said valve body chamber and normally closing said passage opening into the water supply, said chamber entrapping a body of water between the shut-off valve and the check valve when the shut-off valve and check valve are closed to thereby isolate the water supplied into the vessel from the pressured supply thereof, said check valve comprising a poppet member operable to lift into the chamber with the water flow thereinto, the poppet member including an enlarged head element permanently located in the chamber and adopted to plug a chamber entrance defined in the chamber, a restricted stem extending loosely through the chamber entrance, and a second enlarged portion to restrict upward poppet member motion during water flow into the chamber so as to prohibit poppet member interference with the shut-off valve.

* * * * *